United States Patent
George (10) Patent No.: US 12,547,887 B2
(45) Date of Patent: Feb. 10, 2026

(54) SYSTEM FOR DETECTING ELECTRIC SIGNALS

(71) Applicant: UNIVERISTY OF UTAH RESEARCH FOUNDATION, Salt Lake City, UT (US)

(72) Inventor: Jacob Anthony George, Salt Lake City, UT (US)

(73) Assignee: UNIVERSITY OF UTAH RESEARCH FOUNDATION, Salt Lake City, UT (US)

(*) Notice: Subject to any disclaimer, the term of this patent is extended or adjusted under 35 U.S.C. 154(b) by 1284 days.

(21) Appl. No.: 17/230,446

(22) Filed: Apr. 14, 2021

(65) Prior Publication Data

US 2021/0326704 A1  Oct. 21, 2021

Related U.S. Application Data (60) Provisional application No. 63/011,713, filed on Apr. 17, 2020.

(51) Int. Cl.
*G06N 3/08* (2023.01)
*G06F 3/01* (2006.01)
(Continued)

(52) U.S. Cl.
CPC .............. *G06N 3/08* (2013.01); *G06F 3/014* (2013.01); *G06F 3/015* (2013.01); *G06N 3/04* (2013.01); *G06N 3/063* (2013.01)

(58) Field of Classification Search
CPC ............ G06N 3/08; G06N 3/04; G06F 3/014
See application file for complete search history.

(56) References Cited

U.S. PATENT DOCUMENTS

| 4,498,480 A | 2/1985 | Mortensen |
| 8,170,656 B2 | 5/2012 | Tan et al. |
(Continued)

FOREIGN PATENT DOCUMENTS

| CN | 101987048 A | 3/2011 |
| CN | 108681685 A | 10/2018 |
(Continued)

OTHER PUBLICATIONS

Guo et al ("Towards the application of one-dimensional sonomyography for powered upper-limb prosthetic control using machine learning models", 2012, Prosthetics and Orthotics International 37(1), pp. 43-49. (Year: 2012).*

(Continued)

*Primary Examiner* — Alexey Shmatov
*Assistant Examiner* — Clint Mullinax
(74) *Attorney, Agent, or Firm* — Workman Nydegger (57) ABSTRACT

A method for training an artificial intelligence (AI) model for allowing a user to intuitively control an electronic device includes positioning a plurality of sensors at a plurality of particular positions on a human body for sensing electric signals. The method also includes recording a first set of electric signals from each of the plurality of sensors in a continuous manner. At the same time, a first set of motion intents associated with a first sequence of body movement is also recorded in a continuous manner. An AI regression model is trained using a neural network to map the first set of electric signals to the first set of motion intents. In response to receiving a second set of electric signals from the plurality of sensors in a continuous manner, the AI regression model predicts a motion intent, causing the electronic device to perform an action.

14 Claims, 7 Drawing Sheets

(51) Int. Cl.
*G06N 3/04* (2023.01)
*G06N 3/063* (2023.01)

(56) References Cited

U.S. PATENT DOCUMENTS

| | | | |
|---|---|---|---|
| 9,299,248 B2 | 3/2016 | Lake et al. | |
| 9,483,123 B2 | 11/2016 | Aleem et al. | |
| 9,612,661 B2 | 4/2017 | Wagner et al. | |
| 9,975,249 B2 | 5/2018 | Herr et al. | |
| 2008/0285805 A1 | 11/2008 | Luinge et al. | |
| 2010/0137734 A1 | 6/2010 | Digiovanna et al. | |
| 2011/0060461 A1 | 3/2011 | Velliste et al. | |
| 2012/0108962 A1 | 5/2012 | Yoon | |
| 2017/0281036 A1 | 10/2017 | Parvizi et al. | |
| 2017/0312165 A1* | 11/2017 | Johnson | A61B 5/4842 |
| 2018/0177619 A1 | 6/2018 | Zhang et al. | |
| 2018/0301057 A1 | 10/2018 | Hargrove et al. | |
| 2018/0307314 A1 | 10/2018 | Connor | |
| 2020/0222010 A1* | 7/2020 | Howard | G16H 50/20 |
| 2020/0230400 A1 | 7/2020 | Shepherd et al. | |
| 2020/0387756 A1 | 12/2020 | Takehara | |
| 2023/0086004 A1 | 3/2023 | Yang et al. | |

FOREIGN PATENT DOCUMENTS

| | | |
|---|---|---|
| CN | 109195519 A | 1/2019 |
| CN | 109480838 A | 3/2019 |
| JP | 2016-154857 A | 9/2016 |
| JP | 2017-143895 A | 8/2017 |
| JP | 2019-159499 A | 9/2019 |
| JP | 2019-525808 A | 9/2019 |
| JP | 2020-017112 A | 1/2020 |
| KR | 10-2017-0083403 A | 7/2017 |
| WO | 2017/141578 A1 | 8/2017 |
| WO | 2018/026842 A1 | 2/2018 |
| WO | 2018/111138 A1 | 6/2018 |

OTHER PUBLICATIONS

Klein et al ("Development of Algorithms for Computing Knee Stability Parameters Using a Sensor Equipped Knee Sleeve", 2018, Machine Learning and Data Analytics Lab Heisenberg-Professur Sportinformatik Department of Computer Science, all pages. (Year: 2018).*

Ameri et al ("Regression convolutional neural network for improved simultaneous EMG control", 2019, Journal of Neural Engineering, pp. 1-11. (Year: 2019).*

Dantas et al ("Deep Learning Movement Intent Decoders Trained with Dataset Aggregation for Prosthetic Limb Control", 2019, IEEE Transactions on Biomedical Engineering, pp. 1-12. (Year: 2019).*

"DTing-World's First Gesture Control Wristband," retrieved from https://www.amazon.com/Gesture-Wristband-Awareness-Including-Developer/dp/B07BFCG732, retrieved on Feb. 18, 2020, pp. 7.

"Kai: Gesture Controller" retrieved from https://www.indiegogo.com/projects/kai-gesture-controller-buy-now-at-vicara-co#/, retrieved on Feb. 11, 2020, pp. 6.

CTRL-labs scoops up Myo armband tech from North, Lucas Matney, Jun. 27, 2019, accessed: Jun. 14, 2021, https://techcrunch.com/2019/06/27/ctrl-labs-scoops-up-myo-armband-tech-from-north/.

Inside Facebook Reality Labs: Wrist-based interaction for the next computing platform, Tech@Facebook, Mar. 18, 2021, accessed: Jun. 14, 2021, https://twitter.com/FBRealityLabs/status/1372552098882023429?s=19.

Tess, "This 3D printed smart wristband turns hand prosthetics into easy-touse digital mice for amputees," retrieved from https://web.archive.org/web/20190611063119/http://www.3ders.org/articles/20160925-this-3d-printed-smart-wristband-turns-hand-prosthetics-into-easy-to-use-digital-mice-for-amputees.html, Sep. 25, 2016, pp. 12.

George. et al., "Inexpensive Surface Electromyography Sleeve With Consistent Electrode Placement Enables Dexterous and Stable Prosthetic Control Through Deep Learning," Cornell University, Feb. 28, 2020, pp. 4.

* cited by examiner

SYSTEM FOR DETECTING ELECTRIC SIGNALS

CROSS-REFERENCE TO RELATED APPLICATION

This application claims the benefit of U.S. Provisional Application No. 63/011,713, filed Apr. 17, 2020, titled "SYSTEM FOR MYOELECTRIC DETECTION", the contents of which are incorporated by reference herein.

GOVERNMENT RIGHTS

This invention was made with government support under grant Nos. 1533649, 1901236, and 1747505 awarded by the National Science Foundation, grant No. N6600-15-C-4017 awarded by Department of Defense/DARPA, and grant No. OD029571 awarded by the National Institutes of Health. The government has certain rights in the invention.

BACKGROUND

Computers and computing systems have affected nearly every aspect of modern living. Computers are generally involved in work, recreation, healthcare, transportation, entertainment, household management, etc. In particular, computers have provided significant interest and advancement in the field of human-to-machine interactions. For instance, a significant amount of research and development has been invested in the field of prosthetics that can be controlled by a human user. These controls may take many different forms, but often rely upon a computer intermediary to process signals from the human user and communicate commands to motors within the prosthetic. Properly implementing and using these computer intermediaries between the human user and the prosthetic is an area of ongoing development.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a method for training an artificial intelligence (AI) model for allowing a user to intuitively control an electronic device using neuromuscular movements. The method includes positioning a plurality of sensors at a plurality of particular positions on a human body for sensing electric signals (also referred to as surface electromyographic signals and/or sEMG signals) from the human body. The method also includes recording a first set of electric signals for each of the plurality of sensors in a continuous manner and recording a first set of motion intents associated with a sequence of body movement in a continuous manner. Additionally, the method includes generating an AI regression model using a machine learning neural network. The AI regression model continuously maps the first set of electric signals with the first set of motion intents. The method further includes based upon a second set of electric signals generated by the plurality of sensors in a continuous manner, predicting a motion intent; and based upon the motion intent, causing the electronic device to perform an action.

Disclosed embodiments also include a computing system comprising one or more processors and one or more computer-readable media. The one or more computer-readable media store computer-executable instructions that are structured such that, when executed by the one or more processors, the computer-executable instructions configure the computing system to perform various actions. First, the computing system is configured to receive a first set of electric signals generated in a continuous manner by a plurality of sensors positioned at a plurality of particular positions on a human body for sensing neuromuscular movement of the human body. The computing system is also configured to receive a first set of motion intents associated with a first sequence of body movements in a continuous manner. The computing system is further configured to train an artificial intelligence (AI) model using a neural network. The AI regression model is trained such that it continuously maps the first set of electric signals to the first set of motion intents. In response to receiving a second set of electric signals generated by the plurality of sensors in a continuous manner, the AI regression model is configured to predict a motion intent, causing a prosthesis to perform an action associated with the predicted motion intent.

Disclosed embodiments also include a sleeve connected to an electronic device (e.g., a prosthesis). The sleeve includes a plurality of sensors configured to be positioned at a plurality of predetermined positions of a human body to generate electric signals in a continuous manner, in response to sensing neuromuscular movement of the human body. The sEMG sleeve also includes an alignment indicator configured align one or more markers of the human body with one or more markers of the sleeve. Further, the sleeve is in communication with one or more processors and one or more computer-readable media having stored thereon an artificial intelligence (AI) model and computer-executable instructions. The AI regression model is configured to map the electric signals generated by the plurality of sensors to one or more motion intents in a continuous manner. The computer-executable instructions are structured such that, when executed by the one or more processors, the computer-executable instructions configure the sleeve to generate a set of electric signals from the human body in a continuous manner. The sleeve is further configured to use the AI regression model to predict a motion intent in response to the set of electric signals and cause the electronic device to perform an action based upon the predicted motion intent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments, which are illustrated in the appended drawings. Understanding that these drawings depict only typical embodiments and are not, therefore, to be considered to be limiting in scope, embodiments will be described and explained with additional specificity and detail through the use of the accompanying drawings in which.

DETAILED DESCRIPTION

Many human-device interfaces are used to control electronic devices using detected electrical activity from the human body. This electrical activity may include (but are not limited to) electrocardiogram (ECG), myoelectric impulses, neural signals, and/or any electric artifact associated with motion intents (e.g., electric noise associated with movement of muscles and/or tendons). Using these human-device interfaces, a user can control things (including software, hardware, and/or a combination thereof) such as keyboards, light switches, electrical-mechanical devices, and other devices through the detection of electrical signals generated by the human body. Another example of controlling a device through a human-device interface may be a prosthetic device for amputees. While examples of prosthetics devices may be used herein, one will appreciate that this same or similar technology may be applied to any electronic device.

Electronic devices (including, but not limited to, robotic prostheses) may use various different schemes to receive controls from human users and cause robotic components within the electronic devices to function as desired by the human user. One scheme for controlling electronic devices involves the tracking of electric activities associated with the user's body. The electric activities may be (but not limited to) associated with neuromuscular movement, neural signals, electrical signals and/or noises associated with movement of tendons, ligament, bones, skins, organs, and/or muscles and translating that electric activity into commands to an electronic device. While existing technologies allow amputees to control electronic devices, there are significant challenges associated with properly mapping the human user's intentions to the resulting actions of the electronic devices.

The principles described herein are related to training an artificial intelligence (AI) regression model configured to allow users, such as (but not limited to) amputees, to intuitively control electronic devices, such as (but not limited to) prostheses. For example, in the case of a prosthesis, after a physical limb is amputated, most transradical amputees still retain the neural circuits and much of the musculature that controls the missing limb. The movement of the musculature that is still present in the residual limb may be measured and recorded. The recorded data associated with the neuromuscular movement may be mapped to various motion intents. Such neuromuscular movement and motion intent pairs can then be used to train an AI regression model that is configured to allow amputees to intuitively control electronic devices.

When using an electronic device (e.g., a prosthetic limb, an external gripping device, controlling a user interface, etc.), the quality of the training dataset may be related to run-time performance. However, it is difficult to label hand kinematics accurately, in particular if the hand has been amputated. In at least one embodiment, the system may utilize mimicked training and/or mirrored training to generate improved AI models for helping individuals, including amputees, to intuitively control electronic devices (e.g., prostheses).

Conventional methods generally do not track the relevant positions of the sensors to a user's body. Every time a user uses a particular prosthesis, a new model is trained based on the current positions of the sensors and the user's body. Gathering large datasets of sEMG synchronized to motor intent is particularly challenging because user time is limited, and the placement of recording electrodes changes from day to day. Accordingly, such existing methods generate models based on limited training data, and the accuracy of the model cannot be improved as time goes on.

The principles described herein solve the above-described problem by positioning a plurality of sensors at a plurality of particular positions on a human body, such that training data can be obtained via multiple separate sessions, and the trained model continues to improve as more training data is obtained.

In some embodiments, the plurality of sensors are a small, low-cost surface electromyography (sEMG) sensors array configured to detect myoelectric signals from muscles and/or tendons. In some embodiments, the sEMG array includes an electrodes array formed on a sleeve that is configured to be worn by a residual limb. Further, the electrodes array is connected to one or more microprocessors, and the one or more microprocessors are connected to a prosthetic limb, such that a user of the sEMG sleeve is able to control the prosthetic limb intuitively. The microcontroller measures the electrical patterns of muscles and/or tendons and uses those patterns to provide motor input to the prosthetic limb. The device also may be used in gesture-controlled industrial and home applications. Processed sEMG (e.g., rectified data over a 300-ms window) can also be sent to a smartphone in real-time using wireless technology such as Bluetooth or WiFi.

In some embodiments, the sEMG sleeve also includes an alignment indicator configured to align one or more markers of the human body with one or more markers of the sEMG sleeve, such that additional training data may be gathered in different training sessions to continuously improve the trained model. For example, in some embodiments, grommets are used to position a surface electromyographic (sEMG) sleeve onto a residual limb. In some embodiments, one or more UV tattoos and/or biological markings are used to help position/reposition the sEMG sleeve.

Figure 1A:
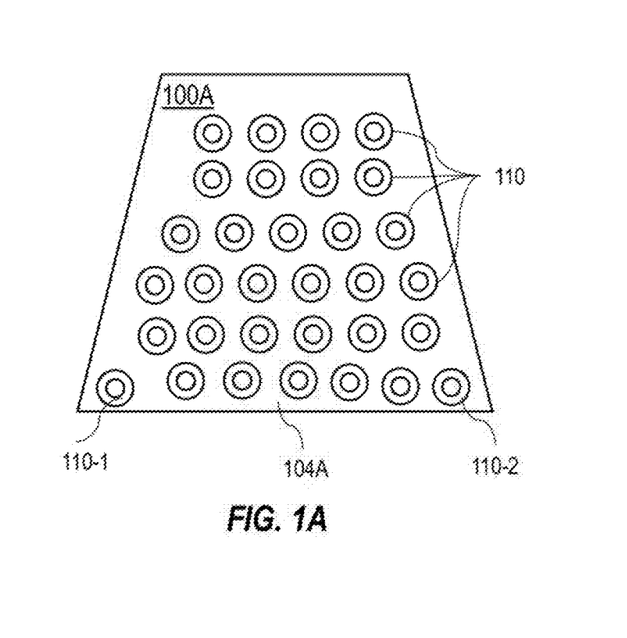
FIGS. 1A-1B depict an electrode layout and an sEMG sleeve in accordance with embodiments of the present invention.
Figure 1B:
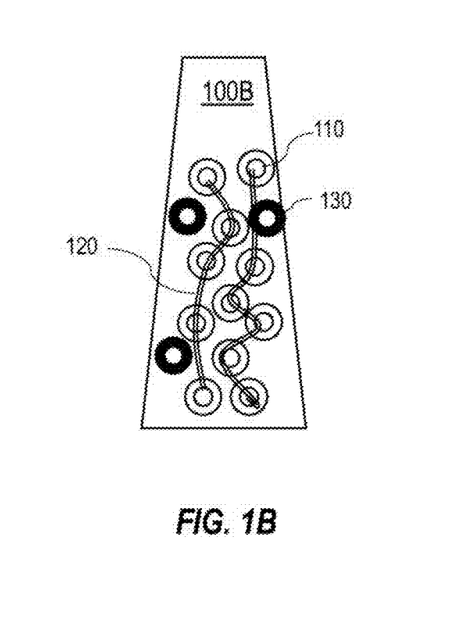

FIGS. 1A-1B depict an example of an sEMG sleeve 100B in accordance with embodiments of the present invention. Referring to FIGS. 1A and 1B, the depicted embodiment of an sEMG sleeve 100B is constructed from neoprene fabric 100A, on which an array of electrodes 110 are attached. As illustrated in FIG. 1B, the neoprene fabric 100A is sewn into a hollow cylindrical shape after electrodes 110 and wires 120 were attached to it. The neoprene can be stretched during donning and doffing, but also provides enough structural integrity to maintain consistent placement on a forearm of a user. In some embodiments, the electrodes 110 are brass-coated marine snaps serve as inexpensive dry electrodes.

In some embodiments, thirty-two electrodes are embedded across the full circumference and length of the sleeve 100B to record extrinsic flexors and extensors. Two additional electrodes 110-1, 110-2 are embedded at the proximal end 104A of the sleeve to be placed along the ulna bone and serve as an electrical reference and ground. In some embodiments, each electrode 110 is soldered to a segment of flexible wire 120 with high-strength heat shrink to reduce wire breakage. In some embodiments, the electrodes 110 are embedded into the neoprene fabric 100A using a crimping tool, and loops of wire 120 are formed near each electrode to alleviate strain when the fabric is stretched. In some embodiments, wires 120 are stitched onto the neoprene fabric 100A and soldered to a 38-pin SAMTEC connector.

Further, as shown in FIG. 1B, in some embodiments, one or more grommets 130 are inserted into the neoprene, unique to one intact individual, such that the grommets 130 are aligned with biological skin markings (e.g., freckles, moles, scars, and/or UV tattoos). In some embodiments, an ultrasonic imaging device may be used to aid in alignment of the grommets 130 with the biological and/or skin markings. In some embodiments, a loose cover (which may be made of Lycra®) may further be included to electrically isolate wire and house front-end devices for amplification and filtering. The inexpensive sleeve can be donned rapidly with sub-centimeter precision and adequate signal-to-noise.

In at least one embodiment, thirty-two monopolar sEMG electrodes 110 (also referred to as electrodes, sensors, and/or neuromuscular sensors) are implemented in the sleeve, and the sensing data generated by the multiple (e.g., thirty-two) monopolar sEMG electrodes 110 are sampled at a predetermined frequency (e.g., 1 kHz) using a processor (e.g., Micro2+Stim Front-Ends and/or a Grapevine Neural Interface Processor). A smoothed Mean Absolute Value (MAV) on the myoelectric signals generated by the electrodes at a predetermined time interval is calculated at a predetermined frequency. For example, a 300-ms smoothed MAV on the 32 single-ended electrodes (or 528 possible differential pairs) is calculated at 30 Hz. In some embodiments, signal-to-noise ratio (SNR) is defined as the mean 300-ms smoothed MAV during movements divided by the mean 300-ms smoothed MAV during rest.

Further, the principles described herein label hand kinematics in a continuous manner. As such, unlike the traditional model training that uses discrete variables to train an AI classifier model, the principles described herein use continuous variables to train an AI regression model that provides a continuous mapping between users' motor intents and the users' neuromuscular movements, which provide users greater and more accurate control over the electronic device.

The AI regression models may be trained to decode motor intent from detected neuromuscular movement (e.g., surface sEMG) under a supervised-learning paradigm. Such a supervised-learning paradigm involves a dataset including data associated with neuromuscular movement (which include myoelectric signals measured by the electrodes) and labeled kinematics (which corresponds to the motion intents).

Figure 2:
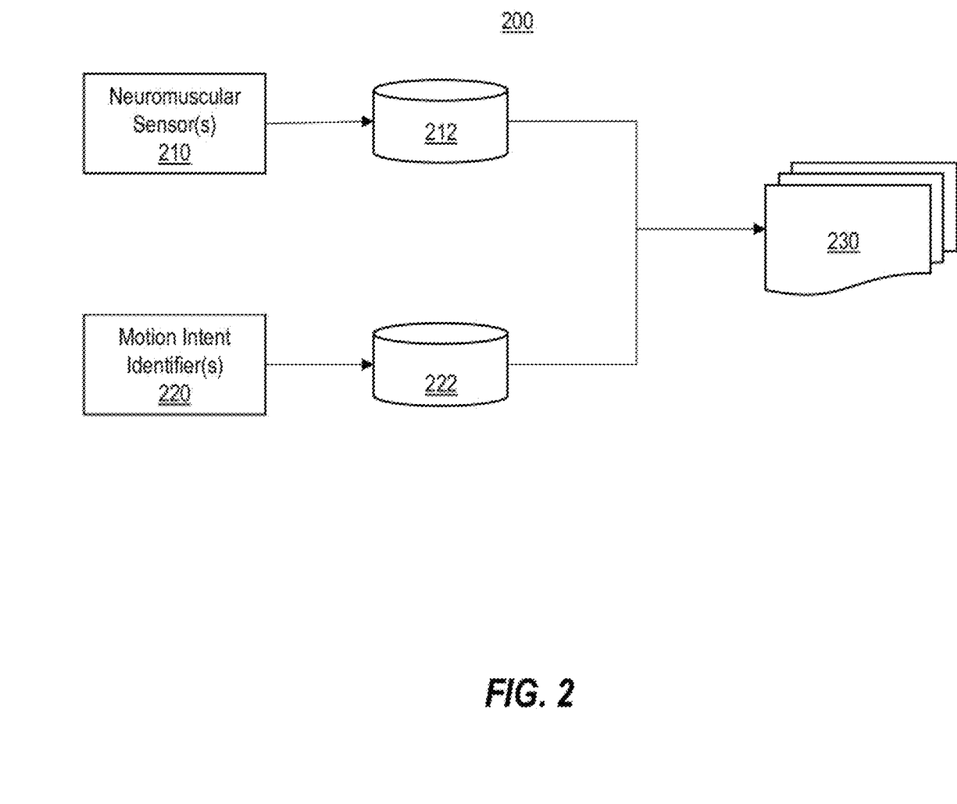
FIG. 2 depicts an example of a system for training an AI model using myoelectric signals and motion intents via a machine learning neural network.

FIG. 2 illustrates an example of a system 200 including one or more neuromuscular sensor(s) 210 and one or more motion intent identifier(s) 220. In some embodiments, the one or more neuromuscular sensor(s) 210 correspond to the electrodes 110 of FIGS. 1A and 1B. The neuromuscular sensor(s) 210 is configured to sense a set of myoelectric signals 212 (also referred to as a first set of myoelectric signals) from a human body (e.g., a residual arm of an amputee) in a continuous manner. The set of myoelectric signals 212 corresponds to a set of the neuromuscular movements of the human body.

The motion intent identifier(s) 220 is configured to detect or identify a set of motion intents 222 (also referred to as a first set of motion intents) in a continuous manner, while the neuromuscular sensor(s) 210 is sensing the set of myoelectric signals 212. In some embodiments, the motion intents include kinematics data associated with intended motions of the human body. In some embodiments, the motion intent identifier(s) 220 may be configured to identify motion intents based on motions of a virtual hand displayed in front of the user when the user tries to mimic the motion of the virtual hand (which is also referred to as mimicked training). In some embodiments, the motion intent identifier(s) 220 may be an infrared camera configured to capture the motion of a not-amputated hand of the user while the user tries to use the amputated hand to mirror the motion of the not-amputated hand (which is also referred to as mirrored training).

During mimicked training, a participant is shown a sequence of motions of a prosthesis (or a virtual prosthesis), and a participant tries to mimic the sequence of motions, including, in the case of an amputee, through the use of their extrinsic muscles that are still present in a residual limb. For example, if the participant has an amputated hand, the muscles associated with the amputated hand are their arm muscles. In some embodiments, surface electromyographic (sEMG) signals are recorded from the extrinsic hand muscles that are still present in the residual arm. The motions of the virtual prosthesis are identified as the motion intents. The sEMG signals and the motions of the virtual prosthesis are used as training data, and sEMG signals with the neuromuscular movements are mapped to the motions performed by the prosthesis.

Mirror training may be used for participants that have one amputated limb and one not-amputated limb. During mirror training, a participant uses muscles associated with the amputated limb to mirror a sequence of motions of the not-amputated limb. The neuromuscular movement of the amputated limb is measured and recorded, and the motion intents of the not-amputated limb are also recorded. Data associated with neuromuscular movement of the amputated limb and data associated with the motion intents of the not amputated limb are mapped to each other.

In some embodiments, the data associated with the motion intents are directly measured based on the motions of the not-amputated limb. Such directly measured motions may be generated and recorded by an imaging sensor (e.g., an infrared camera) and/or a wearable device (e.g., a glove). In some embodiments, the data associated with the motion intents are data indirectly associated with the motions of the not-amputated limb. For example, the indirect motion intents may be an output of a keyboard on which the not-amputated limb was typing. As another example, the indirect motion intents may be an output of a game stick and/or a switch (e.g., a light switch) on which the not-amputated limb was operating.

Alternatively, or in addition, a combined mimicked training and mirror training may be performed. In a combined training, a not-amputated limb tries to mimic a sequence of motions performed by a prosthesis or a virtual prosthesis, and the amputated limb tries to mirror the sequence of motions of the not-amputated limb.

In some embodiments, the motions of the virtual prosthesis or the motions of the not-amputated limb are converted to joint angles associated with a plurality of joints. Any number of joint angles and/or any number of joints of the virtual prosthesis or the non-amputated joint may be computed. The greater number of joint angles that are computed and recorded, the greater precision of the hand movement may be predicted.

For example, in some embodiments, 8 joint angles of multiple joints in a prosthesis hand or a not-amputated hand may be computed and represented by D1 abduction/adduction, D1-D5 flexion/extension, wrist flexion/extension, and wrist pronation/supination. In some embodiments, when mimicked training is implemented, a sequence of motions of the virtual prosthesis is programed, and the joint angles are obtained based on the programmed sequence of motions. In some embodiments, when mirror training or combined training is implemented, an infrared imaging device is used to capture images of the not-amputated hand. The captured images are then converted to joint angles of a plurality of joints.

At the same time, sEMG was recorded from multiple (e.g., 32) single-ended surface electrodes embedded in a custom neoprene sleeve (e.g., as shown in FIGS. 1A-1B). sEMG recordings were sampled at 1 kHz and filtered using a processor. sEMG features are then extracted from the sEMG recordings. In some embodiments, the sEMG features include a predetermined time interval smoothed mean absolute value on a predetermined number of channels calculated at a predetermined frequency. For example, the predetermined time interval may be 300 ms, the predetermined number of channels may include 528 channels, including 32 single-ended channels and 496 calculated differential pairs, and the predetermined frequency may be 30 Hz.

In some embodiments, participants are instructed to mimic the movements of a virtual hand with their non-amputated hand and amputated hand simultaneously. The movements of the virtual hand are referred to as Virtual Kinematics. The intended movements of the amputated hand are referred to as True Kinematics. The movements of the non-amputated hand are referred to as Contralateral Kinematics.

In some embodiments, these hand movements include individuated movement of each degree of freedom (DOF) of the virtual prosthetic hand as well as two combination movements. In some embodiments, the DOF of the virtual prosthetic hand include (but not limited to) flexions/extensions of D1-D5, wrist flexion/extensions; wrist pronation/supination; thumb abduction/adduction) as well as two combination movements (simultaneous flexion of D1-D5; simultaneous extension of D1-D5).

In some embodiments, each user performs multiple (e.g., 10) trials of each movement sequentially, one after another, and the total duration of each individual movement is about 1.5 seconds (made up of a 0.7-s deviation away from the resting hand position, a 0.1-s hold-time at the position of maximum deviation, and then another 0.7-s deviation back to the original resting hand position). There are a predetermined intertrial interval (e.g., 1 second) and a resting period (e.g., 30 seconds) before the start of the first trial to assess resting hand posture.

The preprogrammed movements of the virtual hand are perfectly consistent and isolated, ignoring the variability and biomechanical coupling associated with endogenous hand movements.

The amount of biomechanical coupling and drift in the resting hand position throughout the data collection process are quantified using the Contralateral Kinematics. It is also defined that resting-hand-position drift of the non-amputated hand is the changes in resting position of the hand throughout the entire data collection process. Drift is quantified at each intertrial interval as the current resting position at that intertrial interval to the resting position recorded during the predetermined period (e.g., 30 seconds) prior to data collection.

It is estimated and operationally defined that biomechanical coupling as the unintended movement of non-target DOFs when attempting to move a target DOF. For example, the virtual hand would perform D4 extension perfectly isolated, such that no other DOFs move. However, when the participants attempted to perform isolated D4 extension, there is often associated movement on D3 and/or D5. Biomechanical coupling is quantified as the peak deviation from the resting position of non-target DOFs, where the resting position is defined as the mean value during the previous intertrial interval.

It is assumed that participants are not able to recreate the precision of the virtual hand when attempting to mimic the preprogrammed movements. The differences in the magnitude and timing of the movements between the Contralateral Kinematics and the Virtual Kinematics are quantified. In some embodiments, an infrared motion-capture device is used to capture the Contralateral Kinematics. The deviations in the Contralateral Kinematics due to biomechanical coupling and temporal changes in resting hand position are quantified.

Further, a magnitude of movement is defined as a maximum deviation away from the resting hand position. For example, the virtual hand would perform 10 trials of D4 extension such that each trial had the exact same maximum deviation. However, when the participants attempted to perform D4 extension, there are often variations in the maximum deviation. For each trial, the error in magnitude is the difference in maximum deviation of the Contralateral Kinematics relative to the Virtual Kinematics (in a combination of mimicked training and mirrored training).

To avoid complications due to the participant's reaction time for mimicked training only, in some embodiments, the kinematics are aligned with the sEMG by shifting the kinematic positions by a lag that is determined by maximizing the cross-correlation. In some embodiments, this alignment is performed uniformly across all trials during training.

Referring back to FIG. 2, the set of myoelectric signals 212 detected by the neuromuscular sensor(s) 210 and the set of motion intents 222 detected by the motion intent identifier(s) 220 may be temporarily or permanently stored in a computer-readable storage. The stored set of myoelectric signals 212 and the set of motion intents 222 are then processed by a machine learning neural network 230 (also referred to as a neural network) to train an AI regression model. The AI regression model is configured to continuously map the set of myoelectric signals 212 to the set of motion intents 222.

Figure 3:
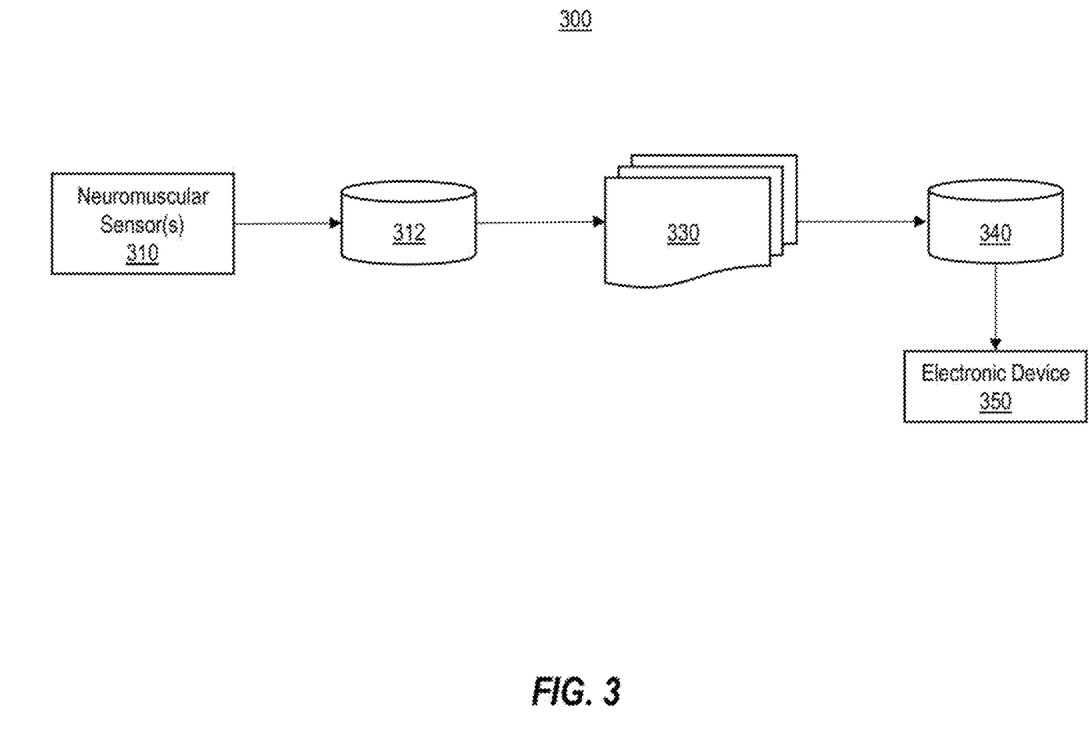
FIG. 3 depicts an example of a system for using an AI model to predict motion intents for intuitively controlling an electronic device.

FIG. 3 illustrates an example of a system 300 that implements an AI model 330 that is trained by the neural network 230 of FIG. 2. Once the AI model 330 is sufficiently trained, the AI model 330 is configured to predict a motion intent 340 based on myoelectric signals 312 detected by one or more neuromuscular sensor(s) 310. The one or more neuromuscular sensor(s) 310 corresponds to the one or more neuromuscular sensor(s) 210 of FIG. 2. The predicted motion intent 340 may then be used to trigger an electronic device 350 to perform a particular action corresponding to the predicted motion intent 340.

The principles described herein further allow training of the AI model 330 to be performed in separate sessions, such that the AI model 330 continues to improve as more training is performed. Referring back to FIG. 2, in a second training session, a second set of myoelectric signals 212 is detected by the neuromuscular sensor(s) 210, and a second set of motion intents 222 is identified or detected by the motion intent identifier(s) 220. Based on the second set of myoelectric signals 212 and the second set of motion intents 222, the neural network 230 updates the previously trained AI model 330 by taking into account continuous mapping the second set of myoelectric signals 212 to the second set of motion intents 222.

Even though the above-described example is related to training an AI model for users with an amputated hand, the principles described herein are not limited to implementations of prostheses and/or amputees. The principles described herein may also be implemented for training any users to use an electronic device (e.g., a virtual keyboard). For example, a user may be typing on a keyboard. The keyboard output may be used as motion intents. The trained model may be used as a virtual keyboard that detects the user's neuromuscular movements, and based on the user's neuromuscular movements to generate corresponding key entries without a real keyboard.

Various different neural networks may be used to train the AI regression model. In some embodiments, the AI regression model includes a modified Kalman filter (MKF). In some embodiments, the recorded sEMG data is converted to heatmaps, and one or more deep or shallow neural networks are used to train the MKF models based on the heatmaps corresponding to the sEMG data.

Figure 4A:
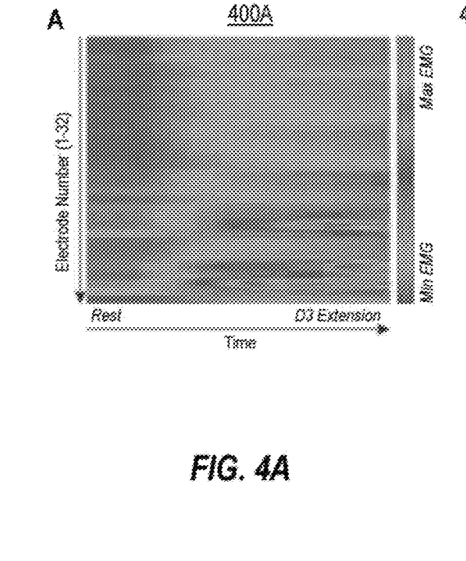
FIG. 4A depicts a heatmap corresponding to myoelectric signals generated by multiple sensors.

FIG. 4A illustrates an example of a heatmap 400A generated based on a set of recorded sEMG data generated by a plurality of electrodes. The plurality of electrodes (e.g., 32 electrodes) corresponds to the plurality of electrodes 110 shown in FIGS. 1A-1B. The x-axis of the heatmap 400A represents a time passing through. The y-axis of the heatmap 400A represents a plurality of electrodes. The different colors of the heatmap 400A represent the different values of the sensed myoelectric signals generated by the plurality of electrodes. The heatmap 400A is then inputted into a neural network (e.g., a deep neural network) as training data to train the AI model.

Figure 4B:
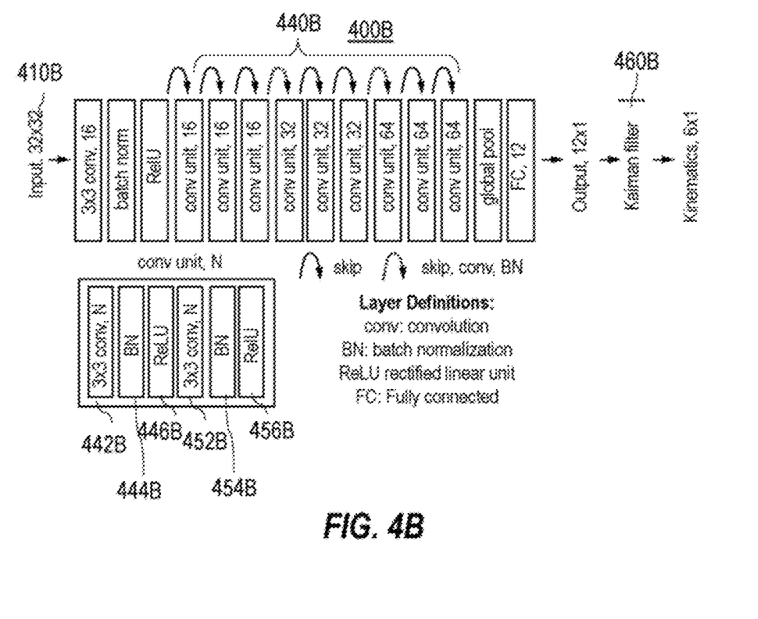
FIG. 4B depicts an example of a deep neural network configured to train an AI model for predict motion intents of a user.

FIG. 4B illustrates a deep neural network 400B that may be implemented to train the AI model. The deep neural network 400B includes multiple layers of convolution across electrodes and across time that allow for complex non-linear activation patterns.

In some embodiments, the neural network 400B is a deep, 74-layer, residual neural network. Input 410B at each time point includes the MAV from 32 single-ended electrode recordings over the last 32 time-samples, which may be generated by the electrodes 110 of FIGS. 1A and 1B and corresponds to the heatmap 400A of FIG. 4A. The network 400B includes nine residually connected convolutional units 440B, each of which includes two repetitions of a 3×3 convolutional layer 442B, 452B followed by batch normalization 444B, 454B, followed by a rectified linear unit 446B, 456B. An optional Kalman filter 460B may be placed on the end of a deep neural network 400B to smooth the kinematic predictions. In some embodiments, the output of the neural network 400B is the kinematic predictions for a six-DOF virtual prosthetic hand.

In some embodiments, the AI regression models are trained using the same random 50% of the trials for each movement. The remaining 50% of the trials are used to evaluate the performance (root-mean-square error, RMSE) of the AI regression models under two conditions: (1) the ability to recreate the training data (i.e., Virtual Kinematics or Contralateral Kinematics), and (2) the ability to recreate the sEMG data. Improvements in the second metric would ultimately yield more dexterous and intuitive prosthetic control. Alignment between the first and second metrics would indicate that improvements in trained-model performance offline are likely to translate to improvements online.

In some embodiments, the AI model is trained with 97% of the training data, and the remaining 3% is used for validation to avoid overfitting. Training automatically terminates once the root-mean-squared-error (RMSE) on the validation data increases to avoid overfitting. In some embodiments, the network 400B is trained using a Stochastic Gradient Descent with Momentum solver with an initial learning rate of 0.001.

In some embodiments, human users complete a real-time virtual hand matching task in which they actively controlled the virtual prosthetic hand and attempted to move an object to a target location. Performance is evaluated as the mean longest continuous-hold duration (i.e., hold duration) within the 10%-error window around the target location out of a theoretical maximum of seven seconds (i.e., seven seconds max if no reaction time).

Figure 5:
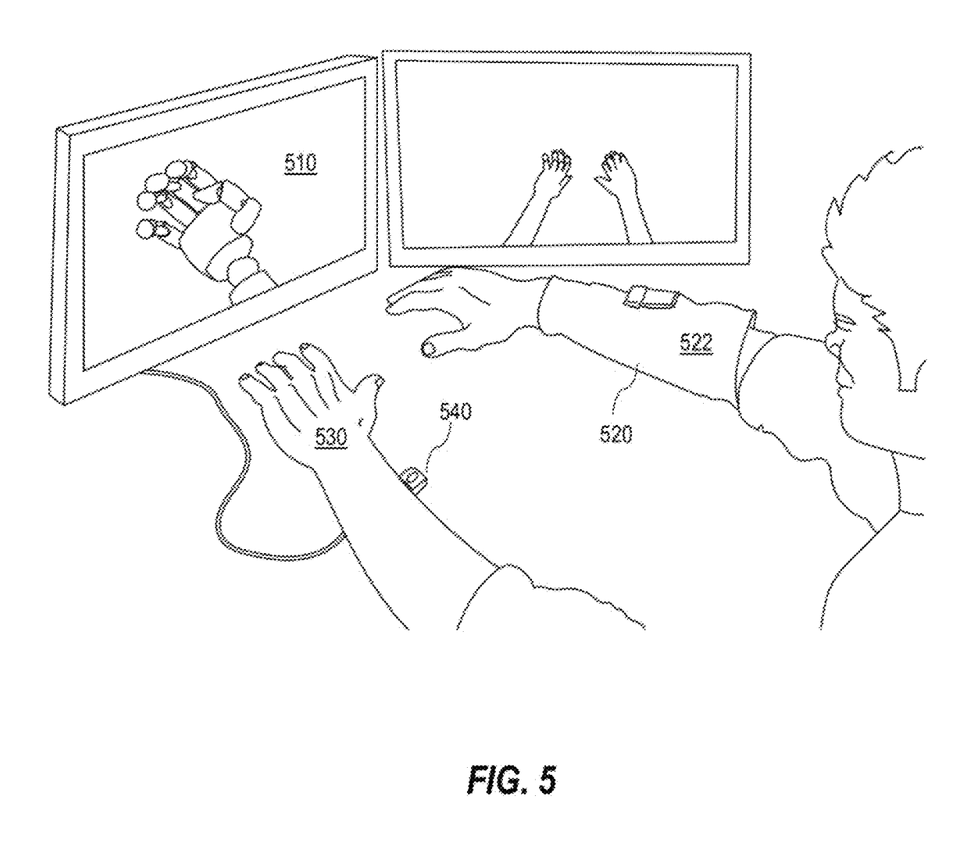
FIG. 5 depicts a training session, during which a user wears an sEMG sleeve on the user's right hand, a virtual hand is displayed in front of the user, and an infrared camera is configured to capture the movements of the user's left hand and/or right hand.

FIG. 5 illustrates an example of a training session, during which a virtual prosthesis (e.g., a virtual hand) 510 is shown to the user. The user's right arm 520 is wearing an sEMG sleeve 522 configured to sense the user's neuromuscular movements. The sEMG sleeve 522 corresponds to the EMG sleeve 100B of FIG. 1B. During a mimicked training, the user's right arm 520 tries to mimic the motion of the virtual prosthesis 510 while the sEMG sleeve 522 generates and records the myoelectric signals corresponding to the neuromuscular movements of the user's right arm 520. In some embodiments, the motions of the virtual prosthesis 510 are recorded as the motion intents.

In some embodiments, mirrored training is performed. During a mirrored training, the user's left hand 530 performs various motions, and the user's right arm 520 tries to mirror the motions of the left hand 530. The motions of the left hand 530 are detected and recorded by an infrared camera 540, which is used as the motion intent.

In some embodiments, a combination of mimicked training and mirrored training is performed. During a combination training, the user's left hand 530 tries to mimic the motions of the virtual prosthesis 510, and the user's right arm 520 tries to mirror the motions of the user's left hand 530.

Notably, in FIG. 5, the user is a non-amputee. Thus, the user's right-hand movements may also be recorded by an infrared camera 540 as motion intents. If the user were to be an amputee, the user's right-hand movements would not be available, and the motion intents must be obtained from another source (e.g., the virtual hand, or the left hand).

The motion intents (obtained via the mimicked training or the mirrored training) and the myoelectric signals (measured and recorded by the sEMG sleeve 522) are then processed by a neural network (e.g., the neural network 400B of FIG. 4B) to train an AI model that continuously maps the myoelectric signals to the motion intents.

Figure 6:
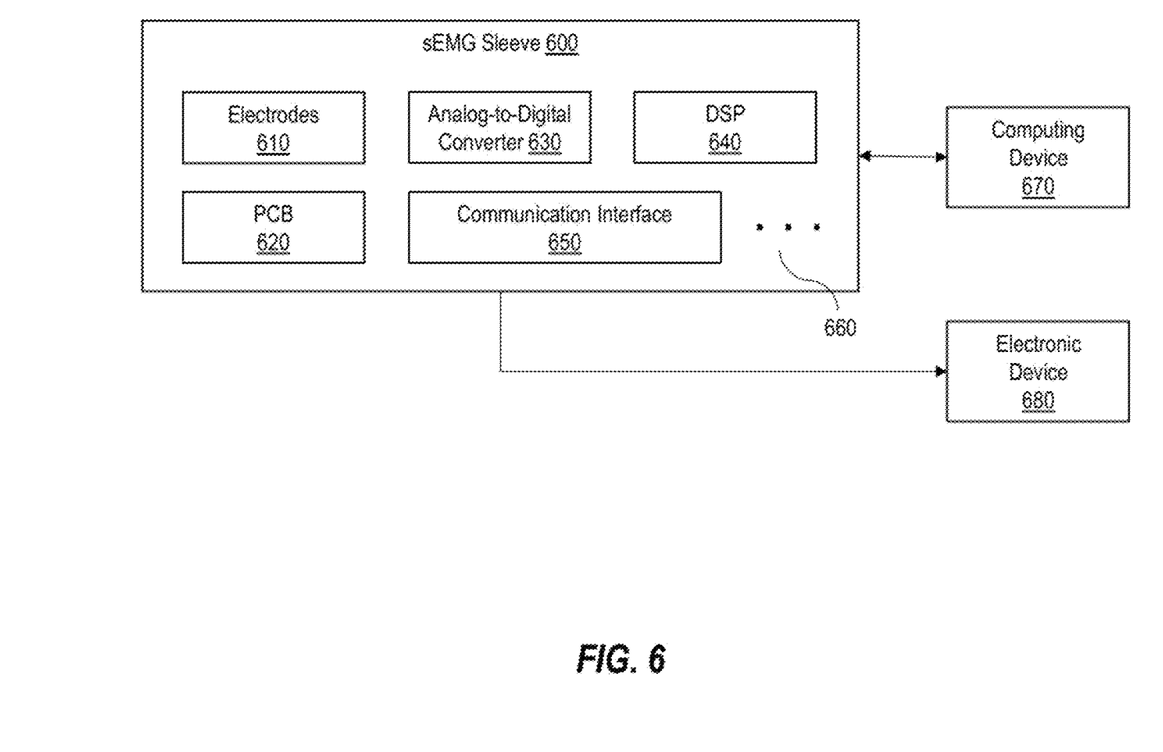
FIG. 6 depicts an example of an architecture of an sEMG sleeve.

FIG. 6 depicts an example of an architecture of an sEMG sleeve 600. The sEMG sleeve 600 corresponds to the sleeve 100B of FIG. 1B. As illustrated, the sEMG sleeve 600 includes one or more electrodes 610 (which corresponds to the electrodes 110 of FIGS. 1A and 1B). The one or more electrodes 610 are configured to generate myoelectric signals in response to sensing the user's neuromuscular movements. Based on the myoelectric signals, the sEMG sleeve 600 is configured to control an electronic device 680 connected thereto.

In some embodiments, the sEMG sleeve 600 further includes a printed circuit board (PCB) 620, on which one or more processors and/or circuitry may be attached. In some embodiments, the sEMG sleeve 600 includes an analog-to-digital data converter 630 configured to convert the analog electrical signals generated by the electrodes 640 into digital data. In some embodiments, the sEMG sleeve 600 also includes a digital signal processor (DSP) 640 configured to further process the converted digital data, including sampling, aggregating, and/or transforming the digital data. The ellipsis 660 represents that there may be additional processors and/or components embedded in the sEMG sleeve 600.

In some embodiments, the sEMG sleeve 600 also includes a communication interface 650 configured to communicate with a computing system 670 (e.g., a user's mobile device or personal computer). In some embodiments, the communication interface 650 is a wireless communication interface, such as (but not limited to) a Bluetooth interface or a WiFi interface.

In some embodiments, the sEMG sleeve 600 is configured to transmit the sensing data to the computing system 670, and the computing system 670 is configured to implement a neural network (e.g., the deep neural network 400B) configured to train the AI regression models based on the received sensing data. The trained AI regression model is then transmitted back to the sEMG sleeve 600 for controlling an electronic device 680 (e.g., a prosthesis) connected thereto.

One will appreciate, however, that the depicted embodiment is provided for the sake of example and explanation and does not limit the invention to the depicted forms. For example, in some embodiments, the processors (including, but not limited to, the analog-to-digital data converter 630 and DSP 640) embedded in the sEMG sleeve 600 may be sufficiently powerful to perform sessions of machine learning training on their own. Alternatively, or in addition, the sEMG sleeve 600 may be configured to communicate with a mobile app of a user, causing the mobile app to show the user a virtual prosthesis during a mimicked training.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
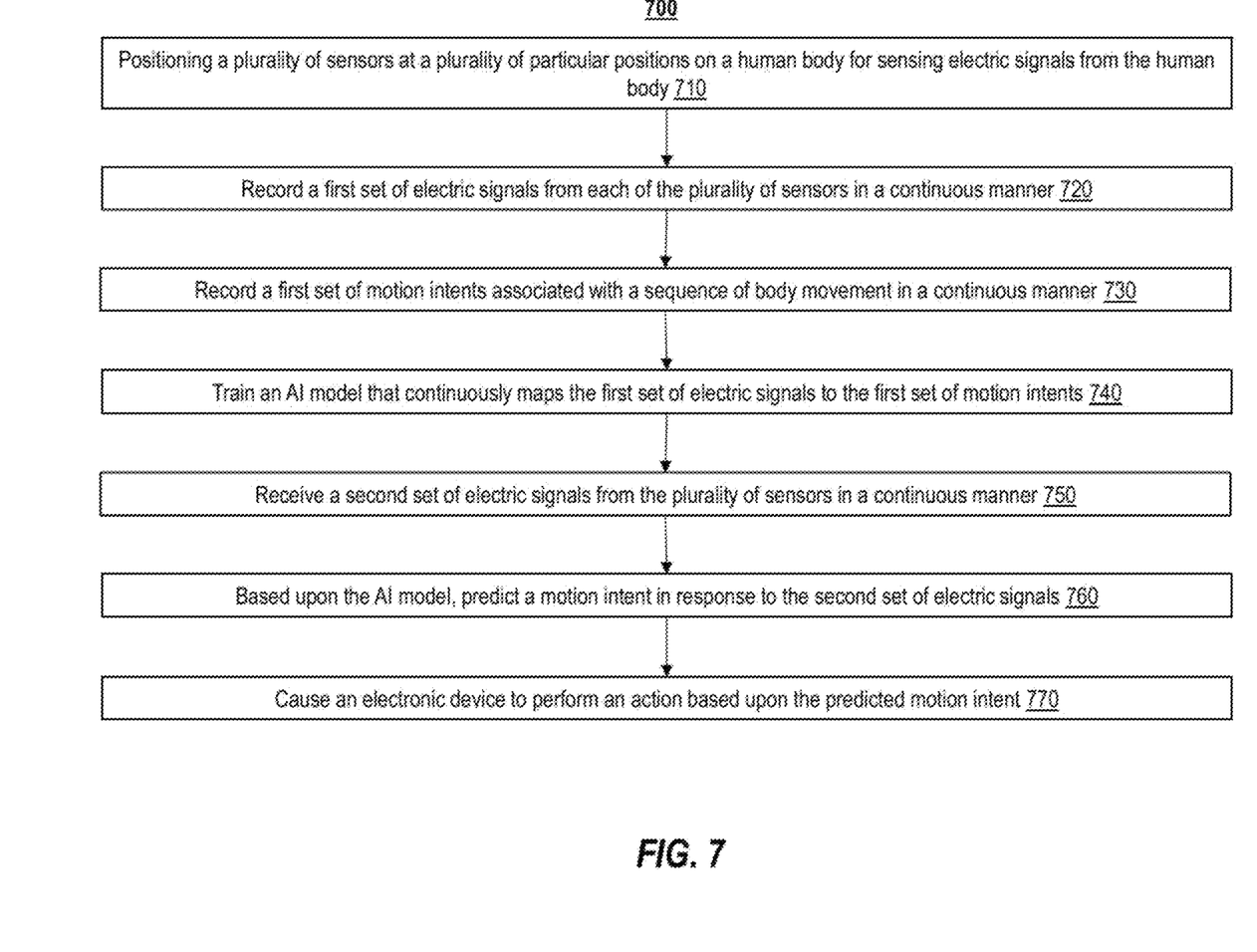
FIG. 7 illustrates a flowchart of an example of a method for training an AI regression model for allowing an amputee to intuitively control a prosthesis.

FIG. 7 illustrates a flowchart of an example of a method 700 for training an AI regression model for allowing a user to intuitively control an electronic device. The method 700 includes positioning a plurality of sensors at a plurality of particular positions on a human body for sensing electric signals from the human body (act 710). The method 700 also includes recording a first set of electric signals from each of the plurality of sensors in a continuous manner (act 720). The method 700 also includes recording a first set of motion intents associated with a sequence of body movements in a continuous manner (act 730).

The method 700 also includes training an AI model using a machine learning neural network (act 740). The AI model continuously maps the first set of electric signals to the first set of motion intents. The method further includes in response to receiving a second set of electric signals in a continuous manner from the plurality of sensors (act 750), predicting a motion intent based upon the AI model (act 760), and causing an electronic device to perform an action based upon the predicted motion intent (act 770).

The training of the AI model may be practiced by a computer system including one or more processors and computer-readable media such as computer memory. In particular, the computer memory may store computer-executable instructions that when executed by one or more processors cause various functions to be performed, such as the acts recited in the embodiments. Computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for training an AI regression model for allowing a user to intuitively control an electronic device using neuromuscular movements, comprising:
    positioning a plurality of sensors at a plurality of particular positions on a human body for sensing neural signals from the human body;
    recording a first set of neural signals sensed by each of the plurality of sensors in a continuous manner, wherein the recording of the first set of neural signals is performed in conjunction with at least one of: (i) mimicked training in which the user attempts to mimic a sequence of motions performed by a virtual limb; and (ii) mirrored training in which the user mirrors motions performed by a not-amputated limb;
    simultaneous with the recording of the first set of neural signals, recording a first set of motion intents in a continuous manner, the first set of motion intents corresponding to a first sequence of body movement;
    training an artificial intelligence (AI) regression model using a machine learning neural network, the AI regression model continuously mapping the first set of neural signals to joint angle values of a virtual hand based upon the first set of motion intents;
    in a different training session, receiving a second set of neural signals from the plurality of sensors in a continuous manner;
    based upon the AI regression model, predicting a second set of motion intents in response to the second set of neural signals, wherein the second set of motion intents are different than the first set of motion intents;
    causing the electronic device to perform an action based upon the second set of predicted motion intents; and
    on a session-to-session basis, incrementally updating the AI regression model by accounting for a continuous mapping of the second set of neural signals to the second set of motion intents.

2. The method of claim 1, wherein the neural network includes a deep neural network and a modified Kalman (MKF) filter.

3. The method of claim 1, further comprising identifying one or more ultra-violet ("UV") tattoos on the human body, wherein the positioning of the plurality of sensors is based on the identified one or more UV tattoos.

4. The method of claim 3, further comprising an alignment indicator configured to align one or more markers of the human body with the plurality of sensors.

5. The method of claim 4, wherein the alignment indicator includes one or more custom-positioned grommets coupled to the plurality of sensors and configured to align with one or more markings of the human body.

6. The method of claim 3, wherein the identifying of one or more UV tattoos comprises identifying one or more markings using an ultrasonic imaging device.

7. The method of claim 1, wherein each set of motion intents is based on a set of motions performed by a virtual hand,
wherein the recording of a first set of neural signals is performed when the human body is mimicking the set of motions performed by the virtual hand.

8. The method of claim 1, wherein each set of motion intents is based on a set of motions performed by a non-amputated limb,
wherein the recording of a first set of neural signals is performed when an amputated limb is mirroring the set of motions performed by the non-amputated limb.

9. The method of claim 8, wherein the set of motions performed by a non-amputated limb is recorded by an imaging device.

10. The method of claim 9, wherein the set of motions performed by the non-amputated limb is aligned based on a deviation of the non-amputated limb from a resting hand position.

11. The method of claim 8, wherein each set of motion intents is generated based on an output of the electronic device operated by the non-amputated limb.

12. The method of claim 11 wherein the electronic device is one of (1) a prosthesis, (2) a keyboard, (3) a game stick, or (4) a switch.

13. A computing system comprising:
one or more processors; and
one or more computer-readable media having stored thereon computer-executable instructions that are structured such that, when executed by the one or more processors, the computer-executable instructions configure the computing system to:
receive a first set of neural signals generated in a continuous manner by a plurality of sensors positioned at a plurality of particular positions on a human body for sensing neural signals from the human body;
simultaneous with the receiving of the first set of neural signals, receive a first set of motion intents associated with a first sequence of body movements in a continuous manner, wherein the first set of motion intents are received in conjunction with at least one of: (i) mimicked training in which a user attempts to mimic a sequence of motions performed by a virtual limb; and (ii) mirrored training in which the user mirrors motions performed by a not-amputated limb; and
train an artificial intelligence (AI) regression model using a machine learning neural network, wherein:
the AI regression model continuously maps the first set of neural signals to joint angle values of a virtual hand based upon the first set of motion intents,
in response to receiving a second set of neural signals generated by the plurality of sensors in a continuous manner and during a different training session, the AI regression model is configured to predict a second set of motion intents, causing an electronic device to perform an action associated with the second set of motion intents, wherein the second set of motion intents are different than the first set of motion intents, and
on a session-to-session basis, incrementally updating the AI regression model by accounting for a continuous mapping of the second set of neural signals to the second set of motion intents.

14. A sleeve connected to an electronic device, comprising:
a plurality of sensors configured to be positioned at a plurality of predetermined positions of a human body to generate electric signals in a continuous manner; and
an alignment indicator configured to align one or more ultra violet (UV) tattoo markers of on the human body with one or more markers of the sleeve;
wherein the sleeve is in communication with one or more processors and one or more computer-readable media having stored thereon an artificial intelligence (AI) regression model and computer-executable instructions, the computer-executable instructions are structured such that, when executed by the one or more processors, the computer-executable instructions configure the sleeve to:
sense a first set of neural signals from the human body in a continuous manner, wherein the sensing of the neural signals is performed during at least one of: (i) mimicked training in which a user attempts to mimic a sequence of motions performed by a virtual limb; and (ii) mirrored training in which the user mirrors motions performed by a not-amputated limb,
use the AI regression model to predict a first motion intent in response to the first set of neural signals, wherein the first motion intent comprises a continuous mapping of neural signals to joint angle values of a virtual hand,
in a different training session, receiving a second set of neural signals from the plurality of sensors in a continuous manner;
based upon the AI regression model, predicting a second motion intent in response to the second set of neural signals, wherein the second set of motion intents are different than the first set of motion intents;
causing the electronic device to perform an action based upon the second motion intent; and
on a session-to-session basis, incrementally updating the AI regression model by accounting for a continuous mapping of the second set of neural signals to the second motion intent.

* * * * *